Aug. 15, 1933.  R. P. BROWN ET AL  1,922,194
MEASURING APPARATUS
Filed April 22, 1927
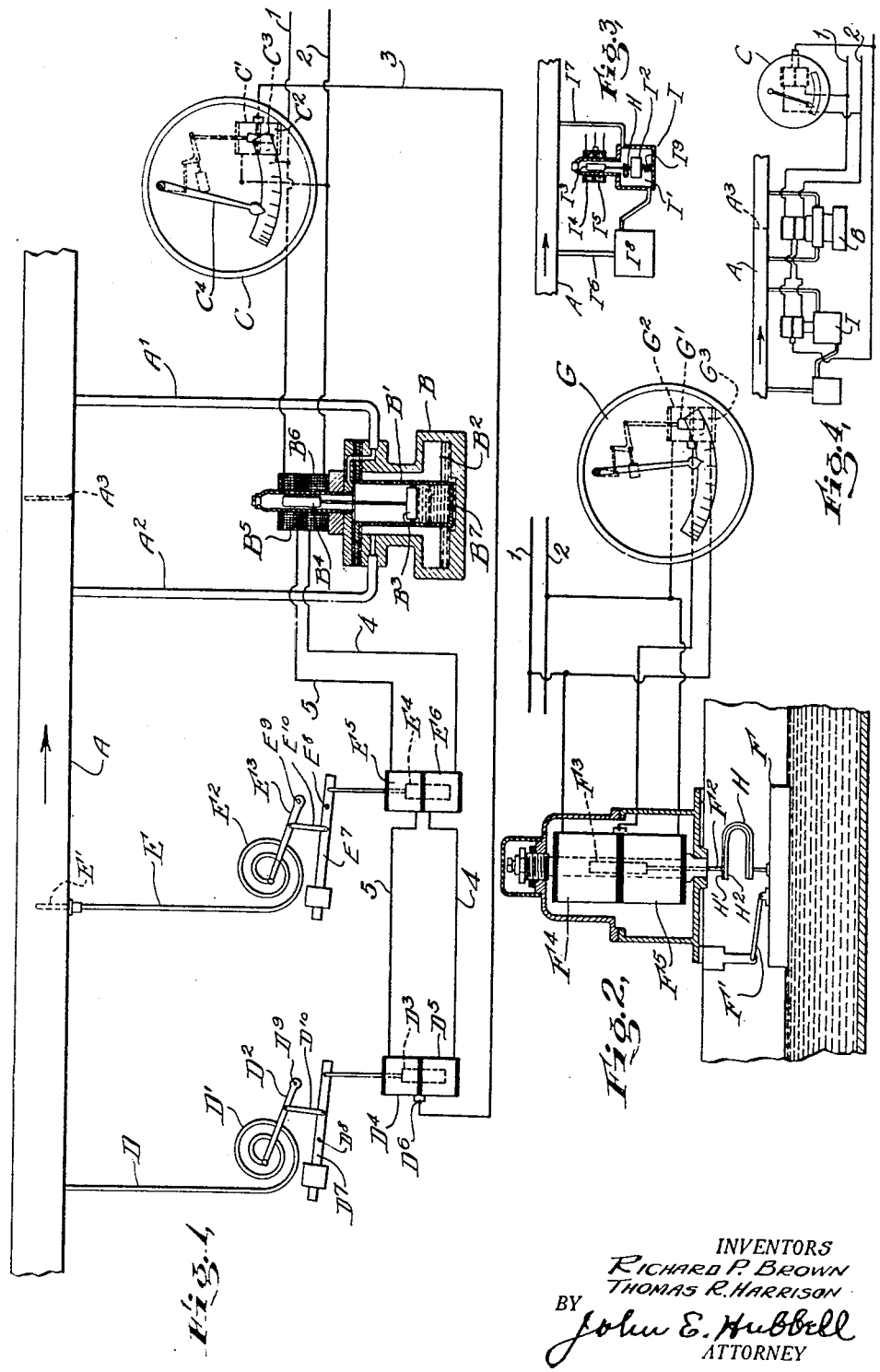
INVENTORS
RICHARD P. BROWN
THOMAS R. HARRISON
BY John E. Hubbell
ATTORNEY Patented Aug. 15, 1933

1,922,194

UNITED STATES PATENT OFFICE 1,922,194

MEASURING APPARATUS

Richard P. Brown, Philadelphia, and Thomas R. Harrison, Wyncote, Pa., assignors to The Brown Instrument Company, Philadelphia, Pa., a Corporation Application April 22, 1927. Serial No. 185,766

6 Claims. (Cl. 177—351)

The general object of our invention is to provide measuring apparatus with improved compensating means, and more particularly to provide such apparatus with means for automatically compensating for changes in condition of a quantity with respect to which the measurement is made. A more specific object of our invention is to provide measuring apparatus comprising an electromagnetic system for transmitting motion from a movable measuring element to an exhibiting device with improved means compensating for the effect of variation in the character of a fluid with respect to which the measurement is made.

The various features of novelty which characterize our invention are pointed out with particularity in the claims annexed to and forming part of this specification. For a better understanding of the invention, however, its advantages and specific objects attained with its use, reference should be had to the accompanying drawing and descriptive matter in which we have illustrated and described preferred embodiments of this invention.

Of the drawing:—

Fig. 1 is a diagrammatic illustration of a flow meter embodying one form of our invention;

Fig. 2 is a diagrammatic illustration of a hydrometer in which our invention is employed Fig. 3 is an elevation illustrating a flow meter density compensating means; and Fig. 4 is a diagrammatic representation of a modification of Fig. 1.

Fig. 1 of the drawing illustrates a flow meter system adapted to measure the flow of steam in a steam main A and consisting of a differential pressure manometer B having its low and high pressure chambers B' and B² connected by pipes A' and A² respectively to the steam main A at the low and high pressure sides of an orifice plate A³ in the main. The high and low pressure manometer chambers are partially filled with a sealing liquid such as mercury and communicate with each other through an aperture B⁷ in the bottom of the low pressure chamber. The variations in mercury level due to the changes in the pressure differential in the manometer give movements to a float B³ resting on the sealing liquid in the low pressure chamber B'.

In the construction shown the movements of the float B³ are transmitted to a suitably exhibiting instrument shown as an indicating instrument by an electromagnetic system which includes a magnetic core or armature B⁴ connected to the float B³ by a rigid stem. Surrounding the magnetic body B⁴ are a pair of superposed end to end solenoid coils B⁵ and B⁶, mounted on a non-magnetic tubular support which forms an extension of the chamber B' and serves as a guide for the armature B⁴. The instrument C comprises a similar pair of superposed coils C' and C² in which a counterbalanced magnetic body or armature C³ is axially movable. The armature C³ is connected to the instrument arm or pointer C⁴ of the meter C, so that as the armature moves down or up from the position shown the pointer swings away from or toward the zero position on the instrument scale.

To give the armature C³ movements corresponding to those caused in the armature B⁴ as the float B³ rises and falls, the coils B⁵ and B⁶ and the coils C' and C² are connected into an impedance bridge system suitably energized by alternating current supply conductors 1 and 2.

To this end each pair of coils B⁵ and B⁶, and C' and C² are connected in series between the supply conductors 1 and 2 and the adjacent ends of the coils B⁵ and B⁶ are connected to the adjacent ends of the coils C' and C². In so far as above described the flow meter system embodies nothing novel, but on the contrary is of the type shown and claimed in the patent of Thomas R. Harrison, No. 1,743,852, granted January 14, 1930.

The apparatus shown in Fig. 1, differs from that disclosed in said patent in the manner in which the adjacent ends of the coils B⁵ and B⁶ are connected to the adjacent ends of the coils C' and C². As shown the connections employed for this purpose comprise a conductor 3, connected at one end to the adjacent terminals of the coils C' and C² and connected at the other end to conductors 4 and 5, D⁶ representing the junction point of the conductors 3, 4 and 5. The conductor 4, includes two solenoid coils D⁵ and E⁶ and runs from the junction point D⁶ to the upper terminal of the coil B⁶. The conductor 5 includes two solenoid coils D⁴ and E⁵ and runs from the junction point D⁶ to the lower end of the coil B⁵. As an alternative to the arrangement shown in Fig. 1 we may follow the form of the apparatus illustrated in said Patent No. 1,743,852 by connecting the two coils of each pair of coils C' and C², B⁶ and B⁵, E⁶ and E⁵, and D⁵ and D⁴, in series with one another and in parallel with the two coils of each of the other pairs of coils between the supply conductors 1 and 2, while at the same time connecting the junction points of the two coils of each pair to the junction points of the two coils of each other pair.

The coils D⁴ and D⁵ are arranged in end to end relation and form part of the means provided for compensating the flow meter reading for variations in the static pressure of the steam flowing through the main A. Associated with the coils $D^4$ and $D^5$ is an armature core $D^3$ moved axially to the coils $D^4$ and $D^5$ to thereby vary their inductances, by a Bourdon tube pressure gage D connected to the main A and having a helical portion $D'$ to the end of which is connected a lever $D^2$ pivoted at $D^9$ and connected by a link $D^{10}$ and counterbalanced lever $D^7$ to the core $D^3$. The lever $D^7$ is pivotally supported at $D^8$. With the described arrangement an increase or decrease in the pressure of the steam in the main A causes the core $D^3$ to move up or down respectively.

The coils $E^5$ and $E^6$ are arranged in end to end relation and in conjunction with the core $E^4$ and the means for moving the latter, compensate for variation in the temperature of the steam flowing through the main A. The core $E^4$ is moved axially of the coils $E^5$ and $E^6$ upward to increase the reactance of the coil $E^5$ and to diminish the reactance of the coil $E^6$ on a decrease in the steam temperature, and downward to increase the reactance of coil $E^6$ and to decrease the reactance of the coil $E^5$ on an increase in the steam temperature. As shown, the core $E^4$ is thus moved by means of a fluid pressure thermometer E comprising a thermometer bulb $E'$ in the main A and a helix $E^2$, to the movable end of which is connected a lever $E^3$ pivoted at $E^9$ and connected by a link $E^{10}$ and a counterbalanced lever $E^7$ to the core $E^4$, the lever $E^7$ being pivotally supported at $E^8$.

With the flow meter arrangement shown in Fig. 1, an increase in the rate of steam at a given static pressure and temperature results in an increase in the difference between the pressures at the opposite sides of the orifice plate $A^3$ and in consequence raises the mercury liquid level in the low pressure chamber $B'$. The resultant raising of the magnetic body $B^4$ increases the reactance of the coil $B^5$ and decreases the reactance of the coil $B^6$. This increases the current flow in the coil $C^2$ relative to the current in the coil $C'$ and thereby causes the core $C^3$ to move downward until the resultant increase in reactance of the coil $C^2$ and decreases in the reactance of the coil $C'$, again restores the impedance bridge to a condition of balance. A decrease in steam flow in the main A causes the core $B^4$ to move down and the core $C^3$ to move up.

The actual weight rate of steam flow through the orifice $A^3$ is not only a function of the difference between the pressures at the opposite sides of the plate $A^3$, but with any given value of such pressure difference, increases and decreases as the density of the steam increases and decreases. The density of the steam increases and diminishes with the static pressure of the steam and diminishes and increases with the degree of superheat of the steam, and with the described arrangement compensation for changes in static steam pressure and degree of superheat are secured. An increase or decrease in the static pressure of the steam increases or decreases the reactance of the coil $D^4$ relative to that of the coil $D^5$, tends to increase or decrease the strength of the current flowing through the coil $C^2$ relative to that flowing through the coil $C'$, so that other things being equal an increase in the static steam pressure causes the pointer $C^4$ of the indicator C to indicate an increased rate of flow, while a decrease in the static steam pressure moves the pointer $C^4$ in the opposite direction. An increase or decrease in the degree of superheat causes the core $E^4$ to move down or up, and by thus diminishing or increasing the strength of current flowing through the coil $C^2$, relative to that flowing through the coil $C'$, tends to cause the pointer $C^4$ of the indicator C to indicate a corresponding lesser or greater flow of steam through the main A.

Since with saturated steam the temperature of the steam is increased by an increase in the static pressure of the steam, the compensating devices D and E should be so arranged and proportioned that by a given increase or decrease in the saturated steam pressure, the resultant movement of the core $D^3$ should be greater than would be required if it were not necessary to compensate for the effect of the simultaneously produced adjustment of the core $E^4$, which on a change in saturated steam temperature produces an adjustment in the wrong direction. However, by a proper relative proportioning of the parts, the devices D and E may collectively provide the proper compensation for changes in the pressure of saturated steam and the device E provides compensation for changes in the degree of superheat when the steam is superheated. In further explanation of the operation of the apparatus shown in Fig. 1, it is noted that the coils $C'$ and $C^2$ of the actuated element or indicator C are connected in series with one another between the terminals of a source of alternating current, and that the coils $B^5$, $E^5$ and $D^4$ are connected in a circuit branch forming a shunt about the coil $C^2$ while the coils $B^6$, $E^6$ and $D^5$ are connected in a circuit branch forming a shunt about the coil $C'$. The various coils with their connections and associated magnetic bodies constitute a self-balancing impedance bridge.

In the normal balanced condition of the bridge the current flow through the coil $C'$ is equal to the current flow through the coil $C^2$, and the current flow through each shunt is equal to the current flow through the other shunt. In general, however, the potential drop through the coil $C'$ is different from the potential drop through the coil $C^2$. When the bridge is in balanced condition, the potential drop through the coil $C'$ is equal to the potential drop through coils $B^6$, $E^6$ and $D^5$. Likewise when the bridge is in balanced condition the potential drop through the coil $C^2$ is the same as the potential drop through coils $B^5$, $E^5$ and $D^4$.

Any movement of any one of the magnetic bodies $B^4$, $E^4$ and $D^3$, changes the relative inductances of the two associated coils, and thus changes the relation between the potential drops through the two shunt circuits. This tends to produce a current flow through the conductor 3 and thereby makes the current flows through the coils $C'$ and $C^2$ momentarily unequal. Whenever the current flow in one of the coils $C'$ and $C^2$ thus becomes momentarily greater than the current flow in the other coil, the magnetic flux in the coil carrying the greater current increases while the magnetic flux in the coil carrying the lesser current decreases, which results in movement of the magnetic body $C^3$ in such a manner as to increase the impedance of the coil carrying the greater current and to reduce the impedance of the coil carrying the lesser current. The movement of the magnetic body $C^3$ thus adjusts the impedance of the coils $C'$ and $C^2$ until the potential drop across each becomes such a proportion of the total potential drop across the bridge that the potential at the mid point between the two coils C' and C² equals the potential at the mid point between the series of coils making up the other arm of the inductance bridge thereby rebalancing the bridge.

In the balanced condition of the bridge the two coils of each end to end pair D⁴ and D⁵, E⁵ and E⁶, B⁵ and B⁶, and C' and C², exert opposing actions on the corresponding magnetic body which are substantially equal in all operative positions of that body. In consequence, when the bridge is in its balanced condition none of the various magnetic bodies D³, E⁴, B⁴ and C³ is subjected to any magnetic action tending to move it out of its position. Any change in position of any one of the magnetic bodies D³, E⁴ and B⁴ tends to unbalance the bridge, and when the bridge is unbalanced there is a reaction between each pair of coils and the corresponding magnetic body or core tending to displace the latter. Whenever the bridge is unbalanced, however, the receiver element core C³ is the only one operatively affected by the unbalance, due to the fact that the mechanical force acting upon each of the magnetic bodies B⁴, E⁴, and D³, is so much greater than the force acting on those bodies due to the magnetic field that the magnetic bodies B⁴, E⁴, and D³, are unaffected in position by unbalance of the bridge. The forces then acting on the last mentioned magnetic body move the latter into the position in which the bridge is rebalanced. The magnetic body C³ is gravitally balanced and tends to remain in any position which it assumes, and requires only a relatively insignificant force to produce its bridge rebalancing movements. In consequence, the magnetic body C³ by its easily effective rebalancing movements, prevents a condition of bridge unbalance serious enough to have any significant tendency to displace the magnetic bodies D³, E⁴ or B⁴, or to significantly retard or modify the movements of the latter resulting from changes in the conditions to which they are respectively responsive. Each of the last mentioned magnetic bodies is thus substantially free at all times to move into and remain in the position corresponding to the value of the condition to which said body is responsive.

In Fig. 2 of the drawing, a modified form of temperature compensating means as applied to an hydrometer system is shown. The hydrometer consists of a float F freely movable vertically but restricted from longitudinal movement in a fluid main by a pivoted link F' secured to the conduit or receptacle. The float rises and falls as the density of the fluid in the conduit changes. Connected to the float F by a rigid rod F² is an armature F³, movable within a pair of superposed end to end coils F⁴ and F⁵ forming part of an inductance bridge arrangement, such as is shown in Fig. 1, employed in Fig. 2 to give movements to the armature G' and thereby varying the reactances of coils G² and G³ of an indicator G.

The temperature compensating means for the hydrometer system shown in Fig. 2 consists of a bimetallic device H inserted between rigid sections of the rod F² connecting the float F and armature F³.

The temperature compensating device H is a bimetallic thermostat consisting of a pair of U-shaped strips H' and H² having their adjacent surfaces brazed together. The strips H' and H² are formed of metals having different coefficients of expansion, the element H' being made of the metal having the lower coefficient of expansion. On an increase or decrease in temperature, the expansion of the element H' being less than that of the element H², the legs of the compensator move farther apart or closer together and cause the connection between the armature and the float to be correspondingly lengthened or shortened.

The changed depth to which the float sinks in the liquid occasioned by the temperature variations of liquid density is thus prevented from altering the positions of armatures F³ and G' with a given grade or kind of liquid.

In a steam flow meter as shown in Fig. 1 the device D and associated parts may be regarded as compensating either for changes in steam pressure or for changes in steam density, since with any particular steam temperature a measure of the steam pressure is a measure of the steam density and a measure of the steam density is a measure of the steam pressure, the steam density increasing or decreasing as the steam pressure increases or decreases. In general no such relation between pressure and density can be utilized in the case of a liquid, and to compensate for the effective changes in liquid density on flow meter readings other compensating means than those shown in Fig. 1 are required.

In Fig. 3 we have illustrated one arrangement for compensating a flow meter for changes in the density of the liquid metered. The compensator I of Fig. 3 comprises coils I⁴ and I⁵ which may be connected in circuit with the coils B⁵ and B⁶ of the manometer B and the coils C' and C² of the indicator C, as the coils D⁴ and D⁵ are connected in Fig. 1. Cooperating with the coils I⁴ and I⁵ of the density compensator I is a magnetic body I³ carried by a float body I² immersed in a chamber I' filled with the same liquid as that flowing through the conduit A. As shown, the chamber I' is connected to the conduit A at two points along the length of the latter by branches I⁶ and I⁷ so that there may be a slow flow of liquid through the chamber I' sufficient to insure that the density of the liquid in the chamber I' will change as the density of the liquid flowing through the conduit A changes. As shown, the connection I⁶ through which the chamber I' receives liquid from the conduit A is advantageously enlarged to form a chamber I⁸ in which any dirt entering the compensator connection I⁶ from the conduit A may settle out and be prevented from entering the chamber I'.

The operation of the compensator I depends upon the change in the buoyancy force acting on the float body I², which increases and decreases as the density of the liquid increases and decreases. The float body I² may be heavier or lighter than the liquid which it displaces, and is subjected to the action of a controlling spring I⁹ which tends to lift the body I² when the latter is heavier than the liquid which it displaces, and to pull the body I² down when the body is lighter in weight than the displaced liquid. In either event the spring is proportioned to hold the body I² at a neutral or normal level, for some normal density of the liquid in which the body is immersed. The float then moves upward from this normal level on an increase in liquid density and moves down from the normal level on a decrease in the liquid density. The spring I⁹ may of course be arranged to act on the upper side of the body I² instead of on the lower side as shown in Fig. 3. If with the apparatus shown in Fig.

3 compensation for changes in liquid temperature is also desired, such compensation may be had by connecting the float body I² to the magnetic body I³ by a bimetallic thermostatic member H such as is employed in Fig. 2.

It will, of course, be understood that by utilizing the principles of the present invention a flow meter may be compensated for changes in pressure, or temperature, or density of the fluid metered, or that compensation may be made for any two or for all three of these changes in fluid conditions, and in Fig. 4 we have illustrated diagrammatically a liquid flow meter differing from that shown in Fig. 1 in that the compensator D of Fig. 1 is replaced by the compensator I of Fig. 3, so that compensation for changes in the pressure and density and temperature of the liquid may be had.

Our invention is characaterized by its simplicity and effectiveness and the comparative ease with which it may be adapted to use in or in connection with different types of instruments and under different operating conditions.

While in accordance with the provisions of the statutes, we have illustrated and described the best forms of our invention now known to us, it will be apparent to those skilled in the art that changes may be made in the forms of the apparatus disclosed without departing from the spirit of our invention, as set forth in the appended claims and that certain features of our invention may sometimes be used to advantage without a corresponding use of other features.

Having now described our invention, what we claim as new and desire to secure by Letters Patent is:—

1. In a system for measuring changes in a quantity, comprising a magnetic body, means for adjusting the position of said body in response to a change in the condition of the quantity measured, a second magnetic body, means including coils associated with said bodies and forming an impedance bridge comprising two branches through which movements of the first mentioned body give corresponding movements to the second body, and means for varying the relative inductances of said impedance bridge branches to adjust the position of one of said bodies relative to the other.

2. In a measuring system arranged to measure changes of a quantity, comprising a magnetic body, means for adjusting the position of said body in response to one change in the condition of the quantity measured, a second magnetic body, means including coils associated with said bodies forming an impedance bridge comprising two branches through which movements of the first mentioned body give corresponding movements to the second body and means responsive to another condition of said quantity for simultaneously varying the inductances of said impedance bridge branches to compensate for changes in the last mentioned condition.

3. The combination with a fluid container, of a magnetic body, means automatically responsive to one fluid condition within said container for moving said body in definite corerspondence with changes in said condition, a second magnetic body, means including a pair of coils associated with each of said bodies forming an impedance bridge comprising two branches through which movements of the first mentioned body effect corresponding movements of the second body, and means automatically responsive to a second fluid condition in said container for varying the inductances of said impedance bridge branches to adjust the position of said second magnetic body.

4. The combination with a flow meter comprising a magnetic body and means for moving it in automatic response to changes in a rate of fluid flow, of a second magnetic body, means including a pair of coils associated with each of said bodies forming an impedance bridge comprising two branches each of which includes one coil of each pair of coils through which movements of the first mentioned body automatically effect corresponding movements of said second body, and means automatically responsive to changes in a condition of the fluid flowing for simultaneously varying the inductances of said impedance bridge branches and thereby effecting an adjustment of the position of said second magnetic body.

5. In a system for measuring a resultant effect of a plurality of varying related conditions, the combination of a plurality of devices one pertaining to each of said conditions and each comprising a pair of coils, a magnetic body in inductive relation with and movable relative to said coils to vary their relative inductances and means for moving said body relative to the coils in accordance with changes in the corresponding condition, an actuated element comprising a pair of coils and a magnetic body in inductive relation with each of said coils and adapted to be moved relative thereto by changes in the relative current flows in the last mentioned coils, a source of alternating current between the terminals of which the last mentioned coils are connected in series with one another, and means for connecting all of said coils into a self balancing impedance bridge comprising a circuit branch forming a shunt about one of the exhibiting means coils and including one coil of each of said devices connected in series with one another and a circuit branch forming a shunt about the other coil of the exhibiting means and including the remaining coils of said devices connected in series with one another.

6. A flow meter having means for creating a pressure differential varying according to flow, a device mechanically responsive to the pressure differential, a magnetic armature moved by said device, an instrument having a second magnetic armature, a mechanism responsive to a condition causing variation in the fluid density, a third magnetic armature movable by said mechanism, a pair of inductance coils associated with each armature so that movement of the armature relative to its pair of inductance coils increases the inductance of one coil and decreases the inductance of the other coil, a source of variable electric energy, and electrical connections joining the source and the inductance coils into an inductance bridge.

RICHARD P. BROWN.
THOMAS R. HARRISON.